(12) United States Patent
Almgren et al.

(10) Patent No.: US 9,137,785 B2
(45) Date of Patent: Sep. 15, 2015

(54) METHOD AND ARRANGEMENT FOR RESOURCE ALLOCATION IN RADIO COMMUNICATION

(75) Inventors: Magnus Almgren, Sollentuna (SE); Ritta Almgren, legal representative, Sollentuna (SE); Mats Näslund, Bromma (SE); Göran Selander, Bromma (SE); Per Skillermark, Årsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 348 days.

(21) Appl. No.: 13/700,600

(22) PCT Filed: Jun. 7, 2010

(86) PCT No.: PCT/SE2010/050627
§ 371 (c)(1),
(2), (4) Date: Feb. 18, 2013

(87) PCT Pub. No.: WO2011/155879
PCT Pub. Date: Dec. 15, 2011

(65) Prior Publication Data
US 2013/0203454 A1    Aug. 8, 2013

(51) Int. Cl.
*H04W 72/04* (2009.01)
*H04W 12/04* (2009.01)
*H04W 12/12* (2009.01)
*H04W 76/02* (2009.01)

(52) U.S. Cl.
CPC ............ *H04W 72/04* (2013.01); *H04W 72/048* (2013.01); *H04W 12/12* (2013.01); *H04W 76/023* (2013.01)

(58) Field of Classification Search
CPC ... H04W 84/08; H04W 72/04; H04W 72/048; H04W 12/12; H04W 76/023; H04L 5/00; H04L 63/02; H04L 63/04; H04L 63/06; H04L 63/08; H04L 63/10; H04L 63/12; H04L 63/16; H04L 63/18; H04L 63/20; H04L 63/30; H04L 9/08; H04L 9/30
See application file for complete search history.

(56) References Cited

U.S. PATENT DOCUMENTS

| 2008/0233966 A1* | 9/2008 | Scheim et al. ............. 455/452.1 |
| 2009/0119506 A1* | 5/2009 | Allen et al. .................... 713/156 |
| 2009/0245193 A1* | 10/2009 | Gaal et al. ..................... 370/329 |

FOREIGN PATENT DOCUMENTS

| EP | 1 564 943 A1 | 8/2005 |
| EP | 1564943 A1 * | 8/2005 |
| EP | 1 583 379 A2 | 10/2005 |
| EP | 1 809 064 A2 | 7/2007 |

OTHER PUBLICATIONS

International Search Report, Application No. PCT/SE2010/050627, Feb. 17, 2011.

(Continued)

*Primary Examiner* — Wesley Kim
*Assistant Examiner* — Dong-Chang Shiue
(74) *Attorney, Agent, or Firm* — Myers Bigel Sibley & Sajovec, P.A.

(57) ABSTRACT

A method and arrangement in a first mobile terminal (600) for determining allocation of radio resources for DMO communication amongst a group of mobile terminals. M the first mobile terminal, a first determining module 600a determines a communication (Sout, Sin) with a second mobile terminal (602) of the group. A second determining module (600b) determines a resource element (RE) for communication by applying a predefined cryptographic function P based on a terminal identification (K)). The cryptographic function has been configured in the mobile terminals of the group to provide terminal-specific resource elements for different mobile terminals within respective radio frames. A communication module (600c) then communicates with the second mobile terminal (602), either by transmission or reception of the data, on the determined resource element (RE).

28 Claims, 3 Drawing Sheets

(56) References Cited

OTHER PUBLICATIONS

European Telecommunications Standards Institute, "Reconfigurable Radio Systems (RRS); System Aspects for Public Safety", ETSI TR 102 733 V1.1.1 Technical Report, Mar. 2010, 57 pages, downloaded from http://www.etsi.org/deliver/etsi_tr/102700_102799/102733/01.01.01_60/tr_102733v010101p.pdf.
Parkinson, "TETRA security" *BT Technol J.*, vol. 19, No. 3, Jul. 2001, pp. 81-88.

* cited by examiner

Receive:

METHOD AND ARRANGEMENT FOR RESOURCE ALLOCATION IN RADIO COMMUNICATION

CROSS REFERENCE TO RELATED APPLICATION

This application is a 35 U.S.C. §371 national stage application of PCT International Application No. PCT/SE2010/050627, filed on 7 Jun. 2010, the disclosure and content of which is incorporated by reference herein in its entirety. The above-referenced PCT International Application was published in the English language as International Publication No. WO 2011/155879 A1 on 15 Dec. 2011.

TECHNICAL FIELD

The invention relates generally to a method and arrangement for determining allocation of radio resources by a mobile terminal communicating directly with other mobile terminals without being controlled by a network infrastructure.

BACKGROUND

In civilized societies of today, various functions and organisations for maintaining security and safety, referred to as "National Security and Public Safety" (NSPS) organisations, are often dependent on wireless communication for their operation. It is desirable or even a requirement, sometimes, that if the wireless network infrastructure normally used for the communication becomes unavailable, for whatever reason, the mobile terminals used shall still be able to communicate in a so-called direct mode operation (DMO), i.e. communicating directly with each other with no or very limited support and control by the wireless network. This situation may occur during a war-like scenario, or as a result of sabotage or some natural disaster, when the wireless network cannot operate to transmit or receive data to or from the terminals and allocate radio resources for the mobile communication.

Figure 1:
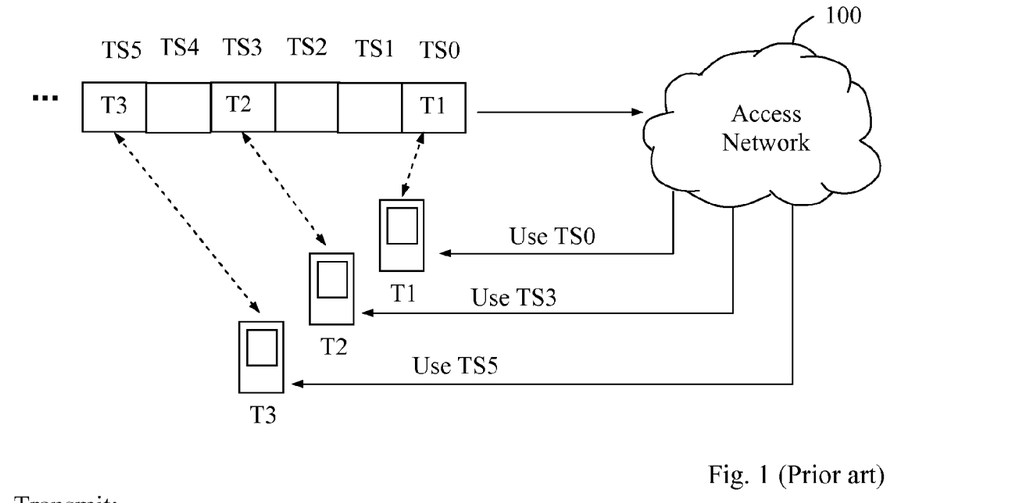
FIG. 1 is illustrates a communication scenario with conventional network-controlled resource allocation, according to the prior art.

FIG. 1 illustrates an example of the normal operation of a mobile wireless access network 100 having various nodes and mechanisms for allocating radio resources to different mobile terminals T1, T2, T3 ... for either transmission or reception of data over a specific carrier frequency when connected to a base station, not shown, in the network 100. The radio resources are separated in the time domain and arranged as resource elements in basically consecutive time slots TS0, TS1, TS2, ... of a radio frame structure, e.g. in the manner of an LTE system. Although only one carrier frequency is illustrated here, it can be easily understood that the resource allocation can be differentiated in the frequency domain as well, depending on the frequency bandwidth used.

In this example, the network 100 instruct terminal T1 to transmit or receive data in time slot IS0 of a current radio frame. Likewise, terminal T2 is instructed to transmit or receive in timeslot TS3 and terminal T3 is instructed to transmit or receive in timeslot TS5 of the radio frame. The network 100 may employ various scheduling mechanisms for allocating the resource elements, in this case time slots and specific carrier frequencies, to the terminals over time, e.g. by taking into account various factors such as the type of communication, services, priorities and the available capacity in the network, among other things.

Assuming that terminals T1-T3 constitute a group of terminals used by an NSPS organisation and the network 100 would get out of order, e.g. in any of the above situations, the terminals T1-T3 are configured to switch into the DMO in order to maintain important communication within the group of terminals T1-T3. A network type called "TETRA" is known today that can be used for NSPS communication operating both in "infrastructure mode", i.e. resembling a conventional mobile network controlling the communication, and in DMO. TETRA uses 25 kHz carriers in four simplex channels and the resource allocation in DMO is made according to a quite rigid, pre-defined and thus predictable scheme for determining when and how terminals should transmit and receive data.

However, at least in some of the situations above, the communication may be very sensitive and/or crucial, and it is often desirable that the communication between two terminals cannot easily be tracked by an illicit eavesdropper and/or that an adversary is unable to disturb or "jam" the communication, at least not without great difficulty. Thus, robustness to interference and protection against eavesdropping is often of great importance in NSPS networks. Confidentiality protection can to some extent be achieved by standard encryption techniques. However, a relatively high level of privacy may require that the identity of the transmitting terminal is not disclosed, and/or similarly, that the radio resources used by any specific terminal is unknown.

These issues above have not been solved properly today for mobile terminals when in DMO. The rigid resource allocation scheme of TETRA, as well as other similar network systems known in the art, is predictable and therefore possible to interpret for an illicit party such that eavesdropping and jamming of a particular communication session can be performed without too much difficulty. Conventional techniques such as frequency hopping may be used, but they usually only protect against random, "natural" disruptions in radio propagation and not against adversarial behavior. Moreover, if the network infrastructure is unavailable, there is no entity that can control and co-ordinate the resource usage, which may lead to conflicts, e.g. devices accidentally using the same radio resource, causing interference.

SUMMARY

It is an object of the invention to address at least some of the limitations, problems and issues outlined above. It is also an object to provide for allocation of radio resources for DMO communication by means of a mobile terminal in a way that the communication of that terminal is difficult to track, and also making it more difficult, or "costly", for an adversary to disturb, or jam, the communication. It is possible to achieve these objects and others by using a method and an arrangement as defined in the attached independent claims.

According to one aspect, a method is provided in a first mobile terminal of determining allocation of radio resources for communicating amongst a group of mobile terminals in direct mode operation, when the radio resources are generally divided into resource elements in different time slots of a radio frame structure. In this method, when a communication with a second mobile terminal of the group is determined, the first mobile terminal determines a resource element for communicating data with the second mobile terminal by applying a predefined cryptographic function P based on a terminal identification. The function P has been configured in the mobile terminals of the group to provide terminal-specific resource elements for different mobile terminals within respective radio frames.

Then, the data is communicated with the second mobile terminal on the determined resource element, either by transmission to or reception from the second mobile terminal. The communication above may thus be either outgoing or incoming relative the first terminal. Thereby, the resource allocation is made practically unpredictable and the DMO communication can be carried out with a minimum of resource conflicts due to the terminal-specific resource allocation while also making eavesdropping and jamming of individual communications more difficult or costly as compared to more predictable allocation schemes.

According to another aspect, an arrangement is provided in a first mobile terminal operative for determining allocation of radio resources for communicating amongst a group of mobile terminals in direct mode operation, the radio resources being generally divided into resource elements in different time slots of a radio frame structure. The first mobile terminal comprises a first determining module adapted to determine a communication with a second mobile terminal of the group, and a second determining module adapted to determine a resource element for communicating data with the second mobile terminal by applying a predefined cryptographic function P based on a terminal identification. As above, the cryptographic function P has been configured to provide terminal-specific resource elements within respective radio frames. The first mobile terminal also comprises a communication module adapted to communicate the data with the second mobile terminal on the determined resource element.

The above method and arrangement may be configured and implemented according to different embodiment. In one embodiment, tracking or jamming of the communication is made even more difficult by the first mobile terminal determining the resource element by applying the cryptographic function P further based on a shared predefined group key configured in the mobile terminals of the group, which key is kept secret to outsiders. The first mobile terminal may further determine the resource element by applying the cryptographic function P further based on a current frame identity to provide radio frame specific resource elements such that the allocation will basically change from frame to frame. In that case, the cryptographic function P may further be chosen from a set of different radio frame specific cryptographic functions P(T) used by the first mobile terminal to determine the radio frame specific resource elements.

In further possible embodiments, determining the resource element may include first determining a virtual resource element by means of the cryptographic function P and then mapping the determined virtual resource element into the resource element for communication by means of a first preset mapping scheme. Alternatively, a "virtual" resource element may first be determined by means of a second preset mapping scheme and then the determined virtual resource element is translated into the resource element for communication by means of the cryptographic function P. In either case, the number of available virtual resource elements is preferably more or less equal to the number of available resource elements for communication, in order to utilise the available bandwidth yet avoiding resource conflicts.

According to one alternative situation, the first mobile terminal determines the resource element for transmission of data to the second mobile terminal, and in that case the terminal identification is an identification of the first mobile terminal. In that case, the first mobile terminal may first check whether the determined resource element is already used in a current radio frame by a third mobile terminal of the group, and if so the first mobile terminal will determine a new resource element in a subsequent radio frame by applying the cryptographic function P based on a first alias for the terminal identification. The first mobile terminal may generate the first alias based on the terminal identification. If the new resource element is likewise used by a third mobile terminal of the group, the first mobile terminal may repeat the determination of new resource elements for subsequent radio frames based on further aliases for the terminal identification, until an unused resource element is obtained.

The first mobile terminal may further determine one or more additional resource elements for transmission in a radio frame based on one or more aliases for the terminal identification. When different protocol layers are employed, e.g. according to the well-known OSI model, a physical protocol layer in the first mobile terminal may receive the data to transmit from a MAC layer.

According to another alternative situation, the first mobile terminal determines the resource element for reception of data from the second mobile terminal, and in that case the terminal identification is an identification of the second terminal. Further, the first mobile terminal may receive the communication from the second terminal on a dedicated resource element used for signalling to announce a forthcoming data transmission from the second terminal, and reads the identification of the second terminal in the communication.

If the radio resources are further separated in the frequency or code domain, the cryptographic function P may comprise a component $P_x$ in the time domain and a component $P_y$ in the frequency or code domain, thereby determining a time component and a frequency or code component of the resource element independently.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Briefly described, a solution is provided in a first mobile terminal for using allocated radio resources for radio communication amongst a group of mobile terminals in DMO, i.e. when the mobile terminals communicate data directly with each other without the support of base stations and resource allocation in a mobile network infrastructure. It is thus assumed that the group of mobile terminals has been formed and well defined in beforehand, e.g. as a function for maintaining security and safety as described above, which allows for certain parameters and functions to be preconfigured in the terminals for the DMO communication within the group as follows.

The first mobile terminal determines, or calculates, a resource element "RE" for communication of data directly with a second mobile terminal, by applying a predefined cryptographic function, denoted P, based on a terminal identification "ID", where the cryptographic function P has been configured in the mobile terminals of the group to provide terminal-specific REs for different mobile terminals within respective radio frames. The RE may be determined either for transmission or reception of data, which will be described in more detail below.

For transmission of data to the second mobile terminal, the first mobile terminal uses its own terminal ID as input to function P to determine which resource element(s) to use. On the other hand, when data is received from the second mobile terminal, the first mobile terminal may be able to use the terminal ID of the second mobile terminal as input to function P to determine which resource element(s) to "listen to". For example, the first terminal may firstly listen to basically all REs in a radio frame to detect the communication of interest from the second terminal, and then read the terminal ID of the sending second terminal if included in the data sent by the second mobile terminal. Alternatively, the terminal ID of the second mobile terminal may already be preconfigured and known in the first terminal and can thus be used by the first terminal for the calculation without first reading it in received data, e.g. providing the advantage that the second terminal does not need to disclose its identity over the air.

With this solution, and by proper choice of the function P, it is possible to achieve more or less "conflict-free" resource allocation for the terminals within the group basically without the support from a network infrastructure, i.e. each terminal will be able to transmit on its own RE within respective radio frames without colliding with other transmission(s). Further, if the cryptographic function P is strong and preferably also based on a key kept secret within the group, it is also very difficult for an adversary to track an individual communication in order to eavesdrop or jam the communication by generating interference. On the other hand, an adversary that wants to jam the communication can always generate interference over the entire radio spectrum, however resulting in great costs for the adversary, e.g. in terms of required disturbing equipment and consumed power.

An exemplary procedure, basically performed by a first mobile terminal, of using allocated radio resources for it radio communication amongst a group of mobile terminals in DMO, will now be described with reference to the flow chart in FIG. 2. It is assumed that the radio resources are generally divided into REs in different time slots of a radio frame structure. In addition to time slot, the radio resources may further be divided into REs in different frequencies within a given frequency spectrum available for the communication in this group, which is quite common for conventional radio communication using different carriers. This description will however be directed to the division of radio resources into REs in different timeslot for simplicity, although it can be understood that the division in different frequencies may be employed as well for this solution. In the latter case, the cryptographic function P can be configured to provide a specific frequency for the RE allocation in addition to a specific timeslot, e.g. by having a time component and a frequency component which will be further described later below.

The group of mobile terminals may have been defined for an NSPS organisation or the like to communicate in DMO if a mobile network normally used for communication in "infrastructure mode" would become unavailable for some reason, e.g. in any of the situations described above. In this example, the first mobile terminal will transmit data to a second mobile terminal of the group and therefore uses its own terminal identity ID to determine an RE for communication of data with the second mobile terminal as follows.

In a first shown action 200, the first mobile terminal basically determines that a communication is to be executed with a second mobile terminal, e.g. when a physical layer of a protocol stack receives data from a higher layer, such as a MAC (Media/Medium Access Control) layer, to be transmitted to the second mobile terminal. A next action 202 accordingly illustrates that the data is obtained for transmission to the second mobile terminal, basically according to a conventional procedure.

In a further action 204, the first mobile terminal determines an RE that can be used for transmission of data to the second mobile terminal, by applying a predefined cryptographic function P based on a terminal ID of the first terminal. The cryptographic function P has been configured in the first mobile terminal as well as other mobile terminals of the group in beforehand for calculation of REs using a terminal ID as input, to provide terminal-specific REs for different mobile terminals within respective radio frames.

Figure 2:
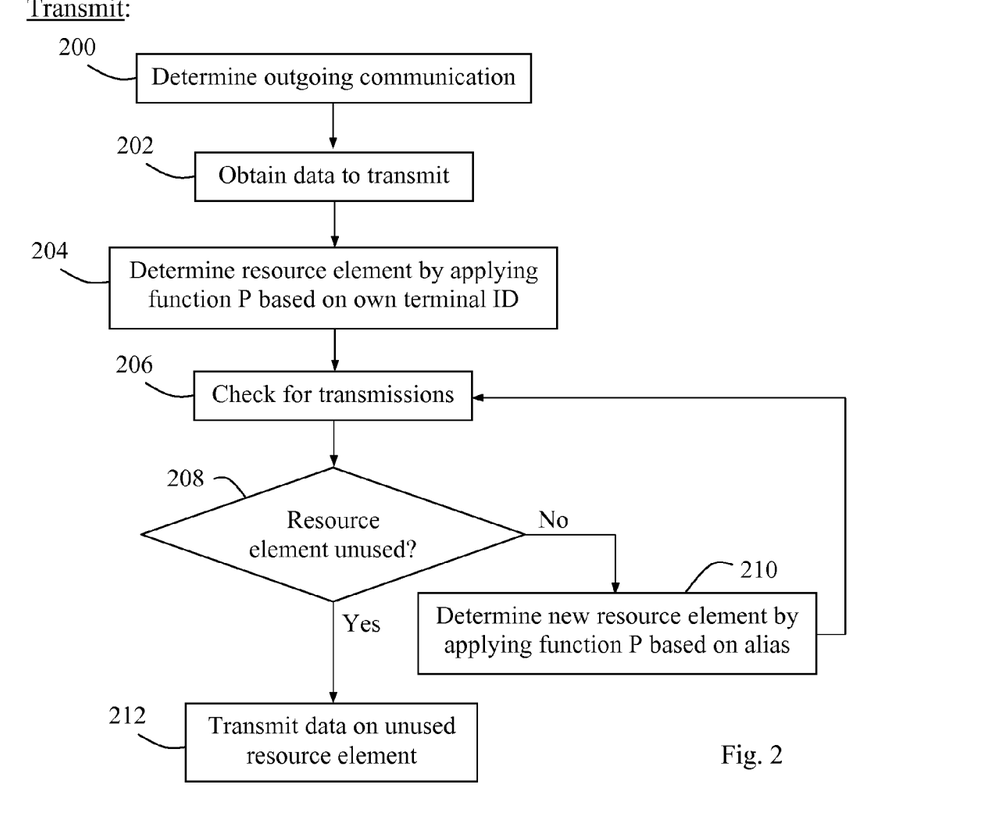
FIG. 2 is a flow chart illustrating a method performed by a transmitting mobile terminal, according to an exemplary embodiment.

In the transmitting case of FIG. 2, the first terminal thus uses at least its own terminal ID as input to the cryptographic function P to hopefully obtain a terminal-specific RE not used by any other mobile terminal in the group, since using other terminal IDs as input to function P provide other terminal-specific REs for respective mobile terminals. However, if the number of available REs in the given radio frame structure is limited and several terminals in the group are currently in communication, it may still happen that two or more mobile terminals arrive at the same RE even though different terminal IDs are used as input to the function P.

Therefore, in this example, the first terminal examines if the used terminal ID results in a resource allocation conflict or collision in the group by checking for transmissions in the determined RE in a current radio frame, in a next action 206, that is to see whether that RE is already used by another "third" mobile terminal of the group. The first terminal is thus able to check, or "test", the terminal ID used in function P by listening to the determined RE in the current radio frame. In this context, the third mobile terminal could be one or more terminals in the group other than the first and second mobile terminals.

If it is determined in a next action 208 that the determined RE is already used by another terminal for transmission of data, i.e. if the RE is already occupied and thus not unused, the first mobile terminal moves on to a next action 210 and determines a new RE for transmission in a subsequent radio frame by applying the cryptographic function P based on a first alias for the previously used terminal ID. In other words, the first alias is used instead of the originally used terminal ID as input to the function P to calculate the new RE.

The procedure then returns to action 206 to check again for transmissions in the newly calculated RE, i.e. to check if the RE determined from the first alias is used by any other third mobile terminal by listening to the RE in a current radio frame. Actions 210, 206 and 208 may thus be repeated for further aliases until an alias results in an unused RE. Then, if it is thus determined in action 208 that the last checked alias results in an unused RE, the first mobile terminal transmit data to the second mobile terminal on an unused RE calculated for the next radio frame based on that alias, in a final shown action 212. In practice, it may be reasonable to repeat actions 210, 206 and 208 for further aliases until a preset counter or time limit expires, which is however somewhat outside the scope of this solution.

In some possible embodiments, the first mobile terminal may have a set of preconfigured aliases to check, one by one, in the above manner, or the first terminal may generate the first alias based on its terminal ID and then, if the first alias $A_{first}$ did not result in an unused RE, generate each following alias $A_{new}$ based on the previous alias $A_{previous}$. For this calculation, a function F may be used such that $A_{first}=F(ID)$, and $A_{new}=F(A_{previous})$.

Another exemplary procedure, again performed by a first mobile terminal, of determining allocated radio resources for reception of data, will now be described with reference to the flow chart in FIG. 3. In this example, the first mobile terminal will thus receive data from a second mobile terminal of the group and therefore uses the terminal ID of the second mobile terminal to determine an RE for reception of data from the second mobile terminal, since the latter terminal determines REs for its transmissions basically according to the above-described procedure of FIG. 2, i.e. using its own terminal ID.

In a first shown action 300, the first mobile terminal starts by receiving data in multiple REs of the radio frame in order to look for and detect whether any data transmitted from any other mobile terminal should be received and used by the first mobile terminal. In this action, the first mobile terminal may thus listen for useful data in practically all REs of the radio frame, or at least those in REs which are intended for transmission of data. In a next action 302, the first mobile terminal basically determines that a communication is coming from a second mobile terminal, e.g. by detecting that data or control signalling from the second mobile terminal is addressed to the first terminal or otherwise intended for reception, such as broadcasted or multicasted data or the like. The communication from the second mobile terminal may thus be either directed exclusively to the first terminal or broadcasted to plural terminals. So far in the procedure, actions 300 and 302 can be performed by means of conventional technique.

In this example, the first mobile terminal then reads the terminal ID of the second mobile terminal in the received communication, i.e. control signalling, in a following action 304. This transmission from the second terminal may preferably use one of a set of fixed and dedicated REs, used exclusively as a signalling RE to announce a forthcoming data transmission from the second terminal. The second mobile terminal will in that case include its terminal ID in the transmission on the signalling RE and the first mobile terminal will listen on that RE to detect any incoming communications. In further variant, it is also possible that the first terminal uses a fixed "signalling ID" or the like as input to the cryptographic function P to determine which signalling RE to listen to, and then use the read terminal ID for reception of data as described above.

In a next action 306, the first mobile terminal uses the read or retrieved terminal ID of the second mobile terminal to determine which RE is used by the second mobile terminal for transmission of data in the communication, by applying the predefined cryptographic function P based on the terminal ID of the second terminal. Alternatively, the first mobile terminal may be configured to listen specifically for communications from the second mobile terminal and may already know the terminal ID of the second mobile terminal, which may have been preconfigured and stored in the first mobile terminal. In the latter case, the first mobile terminal may retrieve the terminal ID of the second mobile terminal from a suitable storage, and use the retrieved terminal ID in function P to determine in which RE to receive data from the second mobile terminal.

Once the RE has been determined, the first mobile terminal can listen to that RE and receive data, in a final shown action 308. Thus, in both the transmitting case of FIG. 2 and the receiving case of FIG. 3, this solution allows the first mobile terminal to determine and use a terminal-specific RE for the DMO communication with the second mobile terminal.

Figure 3:
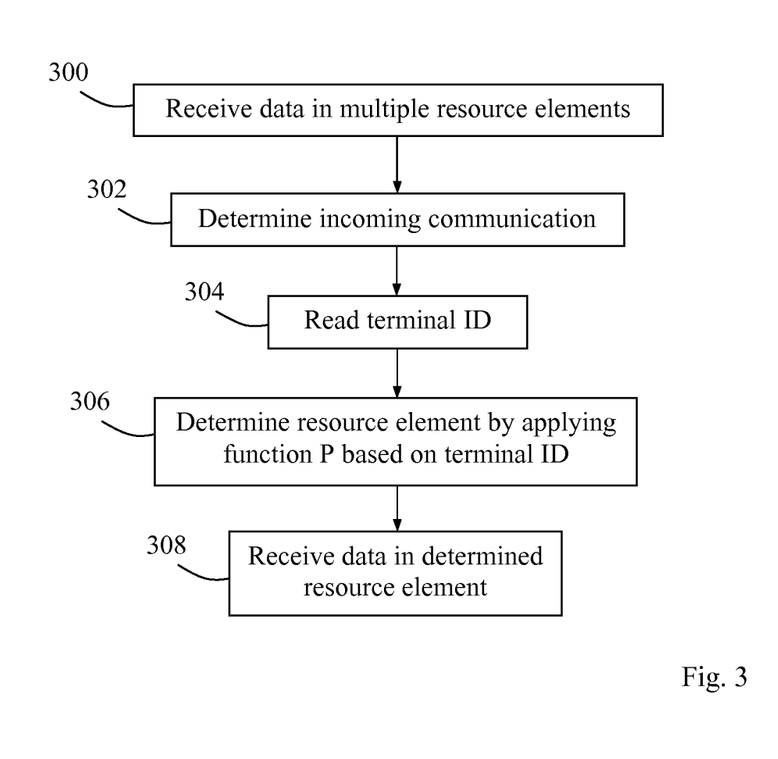
FIG. 3 is a flow chart illustrating a method performed by a receiving mobile terminal, according to another exemplary embodiment.

The solution described above for either the transmitting case of FIG. 2 and the receiving case of FIG. 3, respectively, can be carried out according to different possible embodiments. As mentioned above, the function P may be a cryptographically "strong" function, such as e.g. any of the existing functions AES, HMAC and SHA-256 which are known per se in the art. In order to further increase the protection against eavesdropping and jamming, the cryptographic function P may also be configured such that the RE is determined further based on a shared predefined group key "KG" as input to the function P. In that case, the KG has been configured in the mobile terminals of the group but is kept secret within the group.

In addition, the cryptographic function P may also be configured such that the RE is determined further based on a current frame identity "T" or other suitable system time identity, to provide REs that are also radio frame specific and may vary in successive radio frames for the same communication. Thereby, P will, in consecutive frames, appear "random" to an outsider which will make eavesdropping and/or jamming even more difficult. In this context, "system time" indicates any agreed periodic time framework or scheme jointly used by all mobile terminals on the group to separate their communications from one another.

Thus, the cryptographic function P may be configured to use a terminal ID, the group key KG and a current frame identity or other system time identity T as input, i.e. P=P(ID, KG, T). Still further, the cryptographic function P may be chosen from a set of different predefined radio frame specific cryptographic functions $P^{(T)}$ such that different functions P are used by the first mobile terminal on a per radio frame basis to determine the radio frame specific REs for communication within respective radio frames. Thereby, the allocation of RE will change randomly or "pseudo-randomly" for every radio frame or corresponding system time period.

Further, if a higher transmission rate is wanted, the first mobile terminal may determine one or more additional REs for transmission in a radio frame based on one or more aliases for it terminal ID, such that the first mobile terminal can transmit data in more than one RE per radio frame.

If a resource scheme is used where the radio resources are further separated in the frequency or code domain, the cryptographic function P may comprise a component $P_x$ in the time domain and a component $P_y$ in the frequency or code domain, such that a time component and a frequency or code component of the RE are determined independently. Thus, the RE allocation can in this way be both time specific and frequency or code specific. Using differentiated frequencies or codes in the RE allocation will of course further reduce the risk of resource conflicts which could be helpful particularly if the number of ongoing communications is close to or even exceeds the number of available timeslot in a given radio frame structure.

In order to make the tracking of a particular communication even more difficult, the RE to be used for the communication may be determined by first determining a virtual resource element "VRE" by means of the cryptographic function P. The determined VRE is then mapped into the RE for communication by means of a first preset mapping scheme. Alternatively, a VRE is first determined by means of a second preset mapping scheme and the VRE is then translated into the RE for communication by means of the cryptographic function P.

The use of an intermediate VRE for determining the RE for communication will be described in more detail below with reference to FIGS. 4 and 5. In a protocol stack with multiple layers where a physical layer receives data from a MAC layer, e.g. an LTE stack according to the OSI model, the VREs can be seen as an intermediate "shim" layer dividing the physical layer into an upper physical layer and a lower physical layer.

Figure 4:
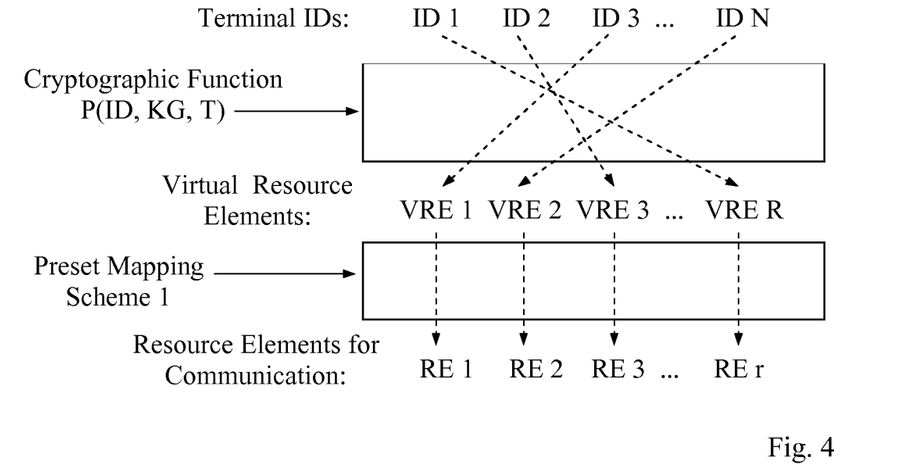
FIG. 4 is a schematic diagram illustrating how the solution can be used to determine resource elements for communication, according to one example.

FIG. 4 thus illustrates one example of how REs can be determined for DMO communication within a group of mobile terminals according to the above-described solution and using a number of predefined intermediate VREs. In this example, determining an RE for communication includes first determining a VRE by means of the cryptographic function P(ID, KG, T) and then mapping the determined VRE into the RE for communication by means of a first preset mapping scheme. In this example, the number of available VREs is R, and the number of REs available for communication according to the radio frame scheme used, is r. In this case, the cryptographic function P may be applied to determine the VREs by a MAC scheduler in the MAC layer and no further modifications are necessary in the higher layers of the protocol stack.

In FIG. 4, a scheme is shown for a case with N terminals in the group, where different terminal IDs: ID 1, ID 2, ID 3 . . . , ID N are used as input to the function P to calculate corresponding VREs: VRE 1, VRE 2, VRE 3, . . . , VRE R. Here, ID 1 results in VRE R, ID 2 results in VRE 3, ID 3 results in VRE 1, and ID N results in VRE 2. Then, each determined VRE is mapped into an RE for communication by means of a first preset mapping scheme.

As mentioned above, the cryptographic function P is preferably a relatively strong function that provides a certain degree of randomisation when converting from terminal ID to VRE, while the first mapping scheme may be a relatively simple mapping scheme, in this example a trivial "one-to-one" function where VRE 1 is mapped into RE 1, VRE 2 is mapped into RE 2, and so forth. Another useful simple mapping scheme could be mapping the first VRE 1 into the last HEN, mapping the next VRE 2 into the next REN−1, and so forth. Preferably, the number R of available VREs is equal, or near equal, to the number r of available REs for communication to achieve good utilisation of the available RE spectrum in the radio frames yet enabling unique allocation of REs to avoid resource conflicts as far as possible. In fact, the fewer REs are used of the available REs, the more difficult or costly it is to jam the ongoing communications, and reduced bandwidth utilisation results in increased robustness against jamming and vice versa.

Figure 5:
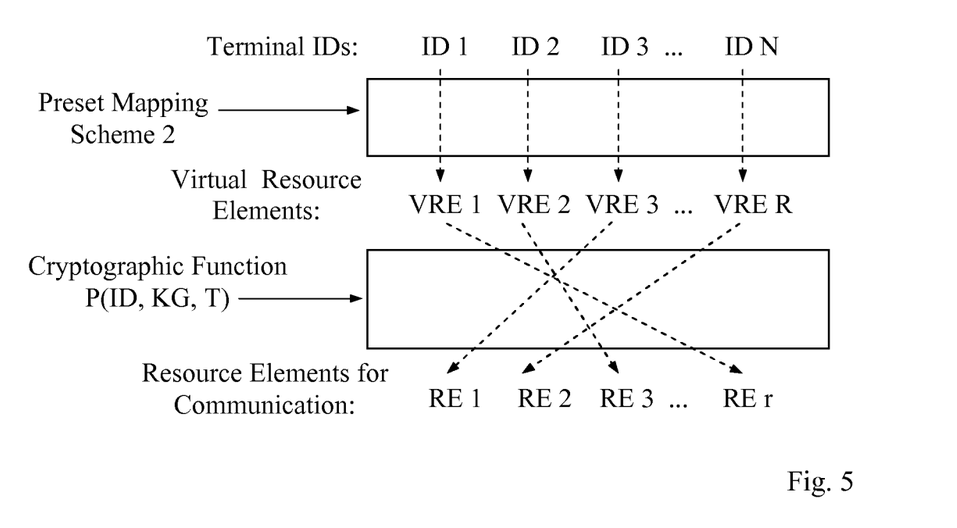
FIG. 5 is a schematic diagram illustrating how the solution can be used to determine resource elements for communication, according to another example.

In the example shown in FIG. 5, determining an RE for communication includes first determining a VRE by means of a second preset mapping scheme and then translating the determined VRE into the RE for communication by means of the cryptographic function P(ID, KG, T). Thus, the second mapping scheme may likewise be a relatively simple mapping scheme, in this example a trivial one-to-one function where ID 1 is mapped into VRE 1, ID 2 is mapped into VRE 2, and so forth. Then, each VRE is used as input to the function P to calculate corresponding REs. In the example shown here, VRE 1 results in RE r, VRE 2 results in RE 3, VRE 3 results in RE 1, and VRE N results in RE 2, hence in a "pseudo-random" manner.

Figure 6:
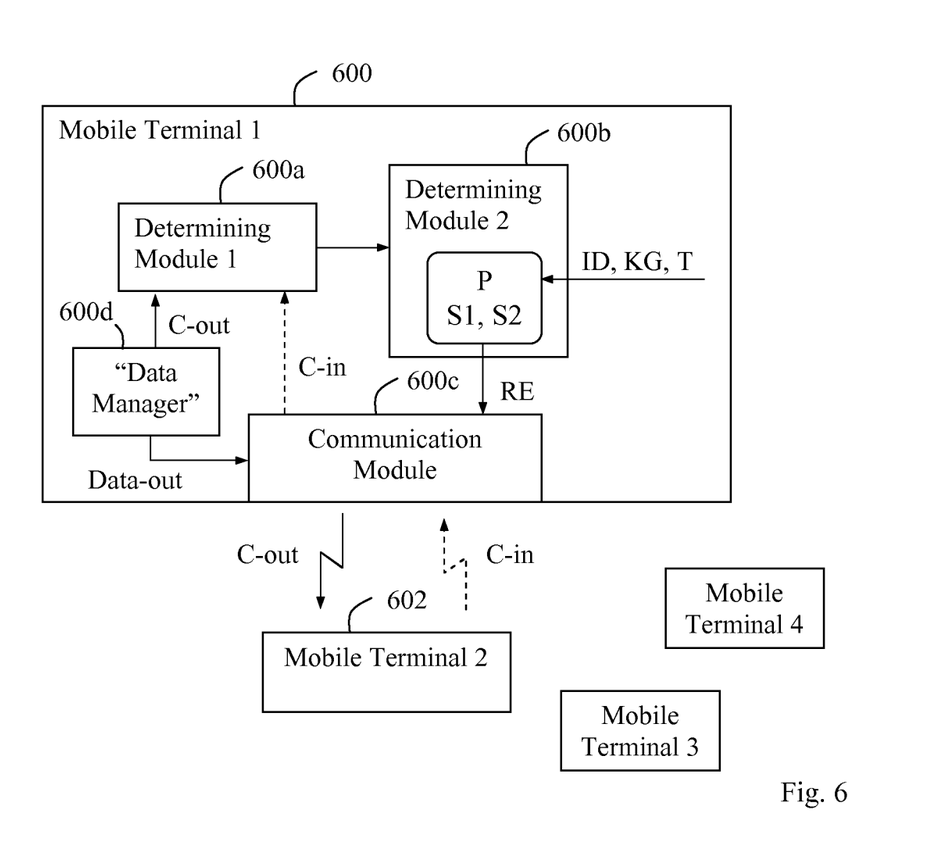
FIG. 6 includes a block diagram illustrating in more detail an arrangement in a first mobile terminal when communicating in DMO with a second mobile terminal amongst a group of mobile terminals, according to further exemplary embodiments.

An arrangement in a first mobile terminal will now be described in more detail with reference to the block diagram shown in FIG. 6. The first mobile terminal 600 may be used to accomplish any of the above-described features and embodiments such as in the exemplary procedures of FIG. 2 and FIG. 3. Various functional entities therein are called "modules" in this description, although they could also be seen as units, blocks, elements, component, as for example. The mobile terminal 600 is operative for using radio resources for communication in DMO amongst a group of mobile terminals of which two are shown in FIG. 6, where the radio resources are generally divided into REs in different time slots of a radio frame structure.

The first mobile terminal 600 comprises a first determining module 600a adapted to determine a communication with a second mobile terminal 602 of the group, in the figure schematically denoted C-out for the case of transmission of data to terminal 602 and C-in for the case of reception of data from terminal 602. Terminal 600 further comprises a second determining module 600b adapted to determine a resource element "RE" for communication of data with terminal 602 by applying a predefined cryptographic function P based on a terminal ID of either the first terminal 600 or the second terminal 602, depending on the direction of the communication.

As in the previous examples, the cryptographic function P has been configured in the mobile terminals of the group to provide terminal-specific REs for different mobile terminals within respective radio frames and may also use a group key KG and/or a frame identity T as input, as described for the above embodiments. The first mobile terminal 600 also comprises a communication module 600c adapted to communicate the data with the second mobile terminal 602 on the determined RE.

The different modules in the first mobile terminal 600 may be configured and adapted to provide further optional features and embodiments. In one exemplary embodiment, the second determining module 600b is further adapted to determine the RE by applying the cryptographic function P further based on a shared predefined group key KG configured in the mobile terminals of the group.

The second determining module 600b may be further adapted to determine the RE by applying the cryptographic function P further based on a current frame identity T to provide radio frame specific REs. The second determining module 600b may be further adapted to choose the cryptographic function P from a set of different radio frame specific cryptographic functions $P^{(T)}$ used to determine the radio frame specific REs for communication within respective radio frames.

The second determining module 600b may be further adapted to determine the RE by first determining a VRE by means of the cryptographic function P and then mapping the determined VRE into the RE for communication by means of a first preset mapping scheme S1. The second determining module 600b may be further adapted to determine the RE by first determining a VRE by means of a second preset mapping scheme S2 and then translating the determined VRE into the RE for communication by means of the cryptographic function P.

The second determining module 600b may be further adapted to determine the RE for transmission of data to the second mobile terminal 602 and the terminal ID is an identification of the first mobile terminal 600. In that case, the communication module 600c may be further adapted to check whether the determined RE for transmission is used in a current radio frame by a third mobile terminal of the group, and if so, the second determining module 600b is further adapted to determine a new RE for transmission in a subsequent radio frame by applying the cryptographic function P based on a first alias for the terminal ID. The second determining module 600b may be further adapted to generate the first alias based on the terminal ID.

The second determining module 600b may be further adapted to repeat the determination of new REs for subsequent radio frames based on further aliases for the terminal ID until an unused RE is obtained. If a higher data rate is wanted, the second determining module 600b may be further adapted to determine one or more additional REs for transmission in a radio frame based on one or more aliases for the terminal ID.

The first mobile terminal may further comprise a data manager 600d in which a physical protocol layer receives the data to transmit from a MAC layer. The second determining module 600b may be further adapted to determine the RE for reception of data from the second mobile terminal, and in that case the terminal ID is an identification of the second terminal. In this case, the first mobile terminal may be adapted to receive the communication from the second terminal on a dedicated resource element used for signalling to announce a forthcoming data transmission from the second terminal, and to read the identification of the second terminal in the communication.

It should be noted that FIG. 6 merely illustrates various functional units or modules in the mobile terminal 600 in a logical sense, although the skilled person is free to implement these functions in practice using suitable software and hardware means. Thus, the invention is generally not limited to the shown structure of the mobile terminal 600, while its functional modules 600a-c may be configured to operate according to the methods and procedures described above for FIGS. 2-5, where appropriate.

The functional modules 600a-d described above can be implemented as program modules of a computer program comprising code means which when run by a processor in the terminal 600 causes the terminal to perform the above-described functions and actions. The computer program may be carried by a computer program product comprising a computer readable medium on which the computer program is stored. For example, the computer program product may be a flash memory, ROM (Read-Only Memory) or an EEPROM (Electrically Erasable Programmable ROM), and the computer program modules described above could in alternative embodiments be distributed on different computer program products in the form of memories within the terminal 600.

By implementing the above-described mechanism for resource allocation in the mobile terminals within the group, DMO communication can be accomplished without support from a network infrastructure, where eavesdropping and jamming are made more difficult as compared to more predictable allocation schemes. Still, resource conflicts can be avoided to a great extent by making the resource allocation terminal-specific in the manner described above.

While the invention has been described with reference to specific exemplary embodiments, the description is generally only intended to illustrate the inventive concept and should not be taken as limiting the scope of the invention. For example, the terms "mobile terminal", "radio resource", "resource element", "radio frame" and "time slot" have been used throughout this description, although any other corresponding functions, parameters, modules and/or units may be used having the features and characteristics described here. The invention is defined by the appended claims.

The invention claimed is:

1. A method in a first mobile terminal of determining allocation of radio resources for communicating amongst a group of mobile terminals in direct mode operation (DMO), the radio resources being generally divided into resource elements in different time slots of a radio frame structure, the method comprising:
   determining a communication with a second mobile terminal of the group,
   determining a resource element for communicating data with the second mobile terminal by applying a predefined cryptographic function P based on a terminal identification, the cryptographic function P being configured in the mobile terminals of said group to provide terminal-specific resource elements for different ones of the mobile terminals within respective radio frames, and
   determining whether said resource element for communicating is used in a current radio frame by a third mobile terminal of said group, and if so, determining a new resource element for transmission in a subsequent radio frame by applying the cryptographic function P based on a first alias for said terminal identification;
   communicating said data to the second mobile terminal using said resource element, wherein said terminal identification is an identifier of the first mobile terminal.

2. A method according to claim 1, further comprising determining said resource element by applying the cryptographic function P further based on a shared predefined group key configured in the mobile terminals of said group.

3. A method according to claim 1 further comprising determining said resource element by applying the cryptographic function P further based on a current frame identity (T) to provide radio frame specific resource elements.

4. A method according to claim 3, further comprising choosing the cryptographic function P from a set of different radio frame specific cryptographic functions P(T) used by the first mobile terminal to determine said radio frame specific resource elements.

5. A method according to claim 1, wherein determining said resource element comprises determining a virtual resource element using the cryptographic function P and then mapping the virtual resource element into said resource element for communication using a first preset mapping scheme.

6. A method according to claim 1, wherein determining said resource element comprises determining a virtual resource element using a second preset mapping scheme and then translating the virtual resource element into said resource element for communication using the cryptographic function P.

7. A method according to claim 5, wherein the number of available virtual resource elements (R) is approximately equal to the number of available resource elements for communication (r).

8. A method according to claim 1, further comprising generating the first alias based on said terminal identification.

9. A method according to claim 1, further comprising repeating said determination of new resource elements for subsequent radio frames based on further aliases for said terminal identification until an unused resource element is obtained.

10. A method according to claim 1, further comprising determining one or more additional resource elements for transmission in a radio frame based on one or more aliases for said terminal identification.

11. A method according to claim 1, wherein a physical protocol layer in the first mobile terminal receives the data to transmit from a MAC layer.

12. A method according to claim 1, further comprising determining said resource element for reception of data from the second mobile terminal, wherein said terminal identification is an identification of the second terminal.

13. A method according to claim 12, further comprising:
receiving said communication from the second terminal on a dedicated resource element used for signalling to announce a forthcoming data transmission from the second terminal, and
reading the identification of the second terminal in said communication.

14. A method in a first mobile terminal of determining allocation of radio resources for communicating amongst a group of mobile terminals in direct mode operation (DMO), the radio resources being generally divided into resource elements in different time slots of a radio frame structure, the method comprising:
determining a communication with a second mobile terminal of the group,
determining a resource element for communicating data with the second mobile terminal by applying a predefined cryptographic function P based on a terminal identification, the cryptographic function P being configured in the mobile terminals of said group to provide terminal-specific resource elements for different ones of the mobile terminals within respective radio frames, and
communicating said data with the second mobile terminal on the resource element,
wherein the radio resources are separated in the frequency or code domain,
wherein the cryptographic function P comprises a component Px in the time domain and a component Py in the frequency or code domain, and
further comprising determining a time component independently of a frequency or code component of said resource element.

15. A first mobile terminal that determines allocation of radio resources for communicating amongst a group of mobile terminals in direct mode operation (DMO), the radio resources being generally divided into resource elements in different time slots of a radio frame structure, the first mobile terminal comprising:
a first determining module adapted to determine a communication with a second mobile terminal of the group,
a second determining module adapted to determine a resource element for communicating data with the second mobile terminal by applying a predefined cryptographic function P based on a terminal identification, the cryptographic function P being configured to provide terminal-specific resource elements within respective radio frames, and to determine said resource element for communicating data to the second mobile terminal, where said terminal identification is an identifier of the first mobile terminal, and
a communication module adapted to communicate said data with the second mobile terminal on the resource element,
wherein the communication module is further adapted to check whether the determined resource element for transmission is used in a current radio frame by a third mobile terminal of said group, and if so, the second determining module is further adapted to determine a new resource element for transmission in a subsequent radio frame by applying the cryptographic function P based on a first alias for said terminal identification.

16. The first mobile terminal according to claim 15, wherein the second determining module is further adapted to determine said resource element by applying the cryptographic function P further based on a shared predefined group key configured in the mobile terminals of said group.

17. The first mobile terminal according to claim 15, wherein the second determining module is further adapted to determine said resource element by applying the cryptographic function P further based on a current frame identity (T) to provide radio frame specific resource elements.

18. The first mobile terminal according to claim 17, wherein the second determining module is further adapted to choose the cryptographic function P from a set of different radio frame specific cryptographic functions P(T) used to determine said radio frame specific resource elements.

19. The first mobile terminal according to claim 15, wherein the second determining module is further adapted to determine said resource element by first determining a virtual resource element using the cryptographic function P and then mapping the determined virtual resource element into said resource element for communication using a first preset mapping scheme.

20. The first mobile terminal according to claim 15, wherein the second determining module is further adapted to determine said resource element by first determining a virtual resource element using a second preset mapping scheme and then translating the determined virtual resource element into said resource element for communication using the cryptographic function P.

21. The first mobile terminal according to claim 19, wherein the number of available virtual resource elements is approximately equal to the number of available resource elements for communication.

22. The first mobile terminal according to claim 15, wherein the second determining module is further adapted to generate the first alias based on said terminal identification.

23. The first mobile terminal according to claim 15, wherein the second determining module is further adapted to repeat said determination of new resource elements for subsequent radio frames based on further aliases for said terminal identification until an unused resource element is obtained.

24. The first mobile terminal according to claim 15, wherein the second determining module is further adapted to determine one or more additional resource elements for transmission in a radio frame based on one or more aliases for said terminal identification.

25. The first mobile terminal according to claim 15, wherein the first mobile terminal further comprises a data manager in which a physical protocol layer receives the data to transmit from a MAC layer.

26. The first mobile terminal according to claim 15, wherein the second determining module is further adapted to determine said resource element for reception of data from the second mobile terminal, and said terminal identification is an identification of the second terminal.

27. The first mobile terminal according to claim 26, wherein the first mobile terminal is adapted to receive said communication from the second terminal on a dedicated resource element used for signalling to announce a forthcoming data transmission from the second terminal, and to read the identification of the second terminal in said communication.

28. A first mobile terminal that determines allocation of radio resources for communicating amongst a group of mobile terminals in direct mode operation (DMO), the radio resources being generally divided into resource elements in different time slots of a radio frame structure, the first mobile terminal comprising:

a first determining module adapted to determine a communication with a second mobile terminal of the group; and a second determining module adapted to determine a resource element for communicating data with the second mobile terminal by applying a predefined cryptographic function P based on a terminal identification, the cryptographic function P being configured to provide terminal-specific resource elements within respective radio frames, and a communication module adapted to communicate said data with the second mobile terminal on the resource element;

wherein the radio resources are separated in the frequency or code domain, wherein the cryptographic function P comprises a component Px in the time domain and a component Py in the frequency or code domain, and the second determining module is adapted to determine a time component independently of a frequency or code component of said resource element.

* * * * *